United States Patent
Akondy et al.

(10) Patent No.: US 9,608,525 B2
(45) Date of Patent: Mar. 28, 2017

(54) SELECTED-PARAMETER ADAPTIVE SWITCHING FOR POWER CONVERTERS

(71) Applicant: Texas Instruments Incorporated, Dallas, TX (US)

(72) Inventors: Subrahmanya Bharathi Akondy, Karnataka (IN); Hrishikesh Nene, Katy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 237 days.

(21) Appl. No.: 14/295,045

(22) Filed: Jun. 3, 2014

(65) Prior Publication Data

US 2014/0355309 A1    Dec. 4, 2014

Related U.S. Application Data

(60) Provisional application No. 61/830,971, filed on Jun. 4, 2013.

(51) Int. Cl.
*H02M 3/335* (2006.01)
*H03H 11/26* (2006.01)
*H02M 1/00* (2006.01)

(52) U.S. Cl.
CPC .... *H02M 3/335* (2013.01); *H02M 2001/0054* (2013.01); *Y02B 70/1491* (2013.01)

(58) Field of Classification Search
CPC ........ H02M 3/28; H02M 3/325; H02M 3/335; H02M 3/33507; H02M 3/33515; H02M 3/33523; H02M 3/3353; H02M 3/33538; H02M 3/33546; H02M 3/33553; H02M 3/338; H02M 3/3385; H02M 1/4258; H02M 2001/0025; H02M 2001/0029; H02M 3/22; H02M 3/24; H02M 3/155; H02M 3/156; H02M 3/157; H02M 2001/0006; H02M 2001/0048; H02M 2001/0054; H02M 2001/0058; Y02B 70/00; Y02B 70/14; Y02B 70/1416; Y02B 70/1491
USPC ....... 363/15–21.18, 40–43, 95–99, 131–134; 323/205–211, 222–226, 235, 271–275, 323/282–288, 351; 327/261, 263–265, 327/276, 278, 279
See application file for complete search history.

(56) References Cited

U.S. PATENT DOCUMENTS

2014/0029316 A1* 1/2014 Adragna ........... H02M 3/33523
                                                           363/21.18

* cited by examiner

*Primary Examiner* — Timothy J Dole
*Assistant Examiner* — Carlos Rivera-Perez
(74) *Attorney, Agent, or Firm* — John R. Pessetto; Charles A. Brill; Frank D. Cimino

(57) ABSTRACT

A selected-parameter adaptively switched power conversion system, for example, includes a counter for determining a period of an output oscillation a power supply switch, where the output oscillation starts when an output current generated by stored power of the power supply coil decays substantially to zero. An event generator for generating a switching delay event in response to the determined output oscillation period and generates a switching delay event in response to a determination of a phase of the output oscillation.

1 Claim, 4 Drawing Sheets

000
SELECTED-PARAMETER ADAPTIVE SWITCHING FOR POWER CONVERTERS

CLAIM OF PRIORITY

This application for Patent claims priority to U.S. Provisional Application No. 61/830,971 entitled "A TECHNIQUE TO IMPLEMENT PROGRAMMABLE VALLEY SWITCHING IN MICRO CONTROLLERS FOR DIGITALLY CONTROLLED POWER CONVERTERS" filed Jun. 4, 2013 in the United States Patent and Trademark Office, wherein the application listed above is incorporated by reference herein.

BACKGROUND

Electronic circuits are designed using increasingly greater integration and/or smaller design features to attain increased processing power and/or increased portability. The demands of such electronic circuitry are often met by increasing the efficiency of power supplies. The efficiency of a switching power supply is dependent upon a pulse width modulation signal that is used to control a power switching element of a power supply. However, the efficiency of the power supply is often affected by operating conditions that are unknown (or not understood well) at the time of the design of the switching power supply (or the design of control components of the switching power supply). As the diversity of electronic circuit designs increase, switching power supplies often require an increase in flexibility in order to be able to meet or exceed increasingly strict operating requirements.

SUMMARY

The problems noted above can be solved in large part by a selected-parameter adaptively switched power conversion system and method. A selected-parameter adaptively switched power conversion system, for example, includes a counter for determining a period of an output oscillation of a power supply switch, where the output oscillation starts when an output current generated by stored power of the power supply coil decays to substantially zero. An event generator generates a switching delay event in response to the determined output oscillation period and generates a switching delay event in response to a determination of a phase of the output oscillation.

This Summary is submitted with the understanding that it is not be used to interpret or limit the scope or meaning of the claims. Further, the Summary is not intended to identify key features or essential features of the claimed subject matter, nor is it intended to be used as an aid in determining the scope of the claimed subject matter.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be example of that embodiment, and not intended to intimate that the scope of the disclosure, including the claims, is limited to that embodiment.

Certain terms are used throughout the following description—and claims—to refer to particular system components. As one skilled in the art will appreciate, various names may be used to refer to a component or system. Accordingly, distinctions are not necessarily made herein between components that differ in name but not function. Further, a system can be a sub-system of yet another system. In the following discussion and in the claims, the terms "including" and "comprising" are used in an open-ended fashion, and accordingly are to be interpreted to mean "including, but not limited to . . . ." Also, the terms "coupled to" or "couples with" (and the like) are intended to describe either an indirect or direct electrical connection. Thus, if a first device couples to a second device, that connection can be made through a direct electrical connection, or through an indirect electrical connection via other devices and connections. The term "portion" can mean an entire portion or a portion that is less than the entire portion. The term "calibration" can include the meaning of the word "test." The term "input" can mean either a source or a drain (or even a control input such as a gate where context indicates) of a PMOS (positive-type metal oxide semiconductor) or NMOS (negative-type metal oxide semiconductor) transistor.

Figure 1:
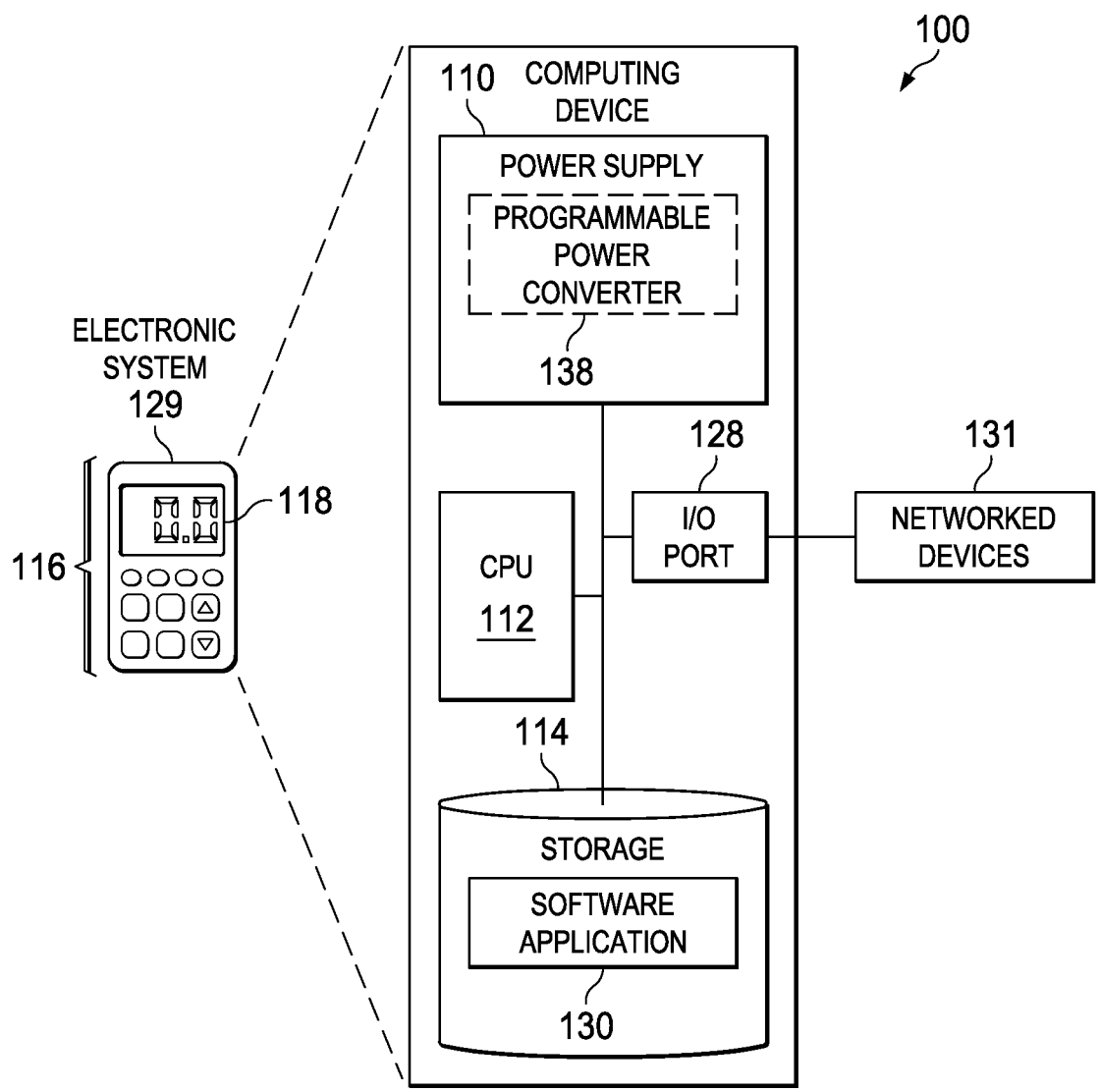
FIG. 1 shows an illustrative electronic device in accordance with example embodiments of the disclosure.

FIG. 1 shows an illustrative computing device 100 in accordance with preferred embodiments of the disclosure. For example, the computing device 100 is, or is incorporated into, an electronic system 129, such as a computer, electronics control "box" or display, communications equipment (including transmitters), or any other type of electronic system arranged to generate radio-frequency signals.

In some embodiments, the computing device 100 comprises a megacell or a system-on-chip (SoC) which includes control logic such as a CPU 112 (Central Processing Unit), a storage 114 (e.g., random access memory (RAM)) and a power supply 110. The CPU 112 can be, for example, a CISC-type (Complex Instruction Set Computer) CPU, RISC-type CPU (Reduced Instruction Set Computer), MCU-type (Microcontroller Unit), or a digital signal processor (DSP). The storage 114 (which can be memory such as on-processor cache, off-processor cache, RAM, flash memory, or disk storage) stores one or more software applications 130 (e.g., embedded applications) that, when executed by the CPU 112, perform any suitable function associated with the computing device 100.

The CPU 112 comprises memory and logic that store information frequently accessed from the storage 114. The computing device 100 is often controlled by a user using a UI (user interface) 116, which provides output to and receives input from the user during the execution the software application 130. The output is provided using the display 118, indicator lights, a speaker, vibrations, and the like. The input is received using audio and/or video inputs (using, for example, voice or image recognition), and electrical and/or mechanical devices such as keypads, switches, proximity detectors, gyros, accelerometers, and the like. The CPU 112 and power supply 110 is coupled to I/O (Input-Output) port 128, which provides an interface that is configured to receive input from (and/or provide output to) networked devices 131. The networked devices 131 can include any device (including test equipment) capable of point-to-point and/or networked communications with the computing device 100. The computing device 100 can also be coupled to peripherals and/or computing devices, including tangible, non-transitory media (such as flash memory) and/or cabled or wireless media. These and other input and output devices are selectively coupled to the computing device 100 by external devices using wireless or cabled connections. The storage 114 can be accessed by, for example, by the networked devices 131.

As further described below, the power supply 110 comprises power generating and control components for generating and control power to enable the computing device 100 to executed the software application 130. For example, the power supply 110 provide one or more power switches, each of which can be independently controlled, that supply power at various voltages to various components of the computing device 100. The computing device 100 can operate in various power-saving modes wherein individual voltages are supplied (and/or turned off) in accordance with a selected power-saving mode and the components arranged within a specific power domain.

The power supply 110, for example, includes a programmable power converter 138. Although the programmable power converter 138 is illustrated as being included in the power supply 110 or as a single (e.g., logical) unit, various portions of the programmable power converter 138 can be included in the same module (e.g., as provided by a die as produced in semiconductor) or different modules.

The CPU 112 is coupled to I/O (Input-Output) port 128, which provides an interface that is configured to receive input from (and/or provide output to) peripherals and/or computing devices 131, including tangible (e.g., "non-transitory") media (such as flash memory) and/or cabled or wireless media (such as a Joint Test Action Group (JTAG) interface). These and other input and output devices are selectively coupled to the computing device 100 by external devices using wireless or cabled connections. The CPU 112, storage 114, and power supply 110 are also coupled to a power supply (not shown), which is configured to receive power from a power source (such as a battery, solar cell, "live" power cord, inductive field, fuel cell, and the like).

As discussed below with reference to the following figures, the programmable power converter 138 is arranged, for example, to provide reduced switching losses and improved system efficiency, while maintaining or reducing size and area requirements. The programmable power converter 138 is arranged to generate precisely controlled pulse width modulated (PWM) waveforms that are adapted to drive control switches of one or more power converters. More particularly, the programmable power converter 138 is arranged to determine the time instants at which control switches are turned "ON" and/or turned "OFF." The programmable power converter 138 determines the switching instants with respect to the time instants at which a power parameter (e.g., voltage and/or current) crosses a threshold value.

The optimum location (e.g., in time) of switching instants, and the associated time periods lying there-between, are normally dependent upon parasitic elements in the circuit and upon the process parameters used to form the circuit. A programmable valley switching control scheme is disclosed herein that provides optimum switching control that operates across changing operating conditions and accommodates various system parameters. In an embodiment, a controller (e.g., such as a microcontroller or a digital signal processor) is used to control one or more attributes of the PWM waveforms, different threshold levels, and other system level controlled variables. The variables are software programmable, which allows more flexibility for implementing the disclosed control schemes and provides an enhanced ability to adaptively adjust to dynamically changing conditions for optimized system performance.

Figure 2:
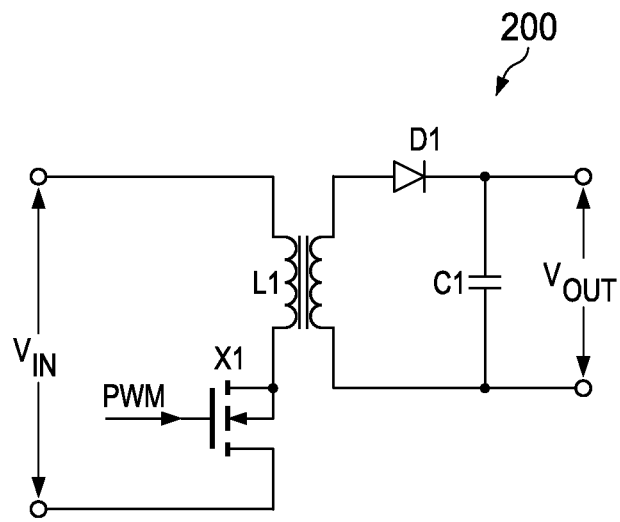
FIG. 2 is a schematic diagram illustrating a selected-parameter adaptively switched power converter in accordance with example embodiments of the disclosure.

FIG. 2 is a schematic diagram illustrating a selected-parameter adaptively switched power converter in accordance with example embodiments of the disclosure. Generally described, power converter 200 is a power converter such as a fly-back converter that is arranged to operate responsively to selected-parameter adaptively switched pulse-width modulation (SPA-PWM) signal. (Although a fly-back converter is used as an example, the disclosed SPA-PWM signal and the SPA-PWM-associated control mechanisms are equally applicable to any power converter controllable using valley switching, described below). Power converter 200 includes, for example, power switch X1, power transformer L1, rectifying diode D1, and power storage capacitor C1.

In general, the efficiency of the power converter 200 can be described in terms of the amount of power that is "lost" (e.g., power supplied to the power converter 200 but is not supplied to a device coupled to the output of the power converter 200) by power converter 200. The amount of power lost by the power converter 200 is substantially influenced by the SPA-PWM signal, which (for example) controls the instant in time at which the power switch X1 is turned ON. In many (if not most) applications, it is important that power loss be kept to a minimum for providing optimum system performance, reduced size and/or cost, and other system benefits.

The relatively precise instant at which the power control switch X1 is turned on is determined in response to one or more programmably selectable parameters. An example of such selected parameters includes the amount of voltage or the amount of current present in switch X1 at a point in time of the operation of power converter 200. Because of parasitic elements of components of power converter 200 (such as leakage inductances, drain-source capacitances, body diodes, and the like), the voltage across the switch and the current flowing through it often oscillate at points in time that are relatively close to a (e.g., theoretically) optimum turn-ON instant in time. The degree, timing, and frequency of such oscillations typically vary in accordance with dynamically changing parameters that occur in operation of power converter 200, and as a result, the exact behavior of such dynamically changing parameters is normally not foreseeable, for example, at design-time. Accordingly, the SPA-PWM signal allows, for example, post-deployment (e.g., during customer use of a product) determination of the optimum switch-X1 turn-ON time that would result in a substantially lowest power loss of power converter 200. Post-deployment determination includes, for example, on-the-fly determination of optimum switching during actual operation of the system.

The optimum switch-X1 turn-ON times typically occur during times described as "valleys" (or "valley points"). Valley switching occurs when the switch X1 is turned ON at a valley of the voltage oscillations, where each valley (because of the phase offset between the voltage and current parameters) indicates a zero-crossing (negative to positive) of current through the switch X1. (A substantially zero voltage value, for example, can be described as the lowest voltage a switch X1 is capable of achieving.) As described below with reference to FIG. 3, a valley switching technique is used to delay the turn ON time of the switch until voltage/current oscillations of the power converter 200 substantially damp down. In many applications, the voltage parameter is more accurately sensed (e.g., as compared with current sensing) and, accordingly, selecting the voltage parameter provides more optimum points at which to determine the instant in time a turn-ON command to switch X1 would occur at the point in time (e.g., valley point) at which the current encounters a zero crossing through switch X1. A zero crossing (for purposes of switching) occurs, for example, when the current flow changes from a negative current to a positive current.

Figure 3:
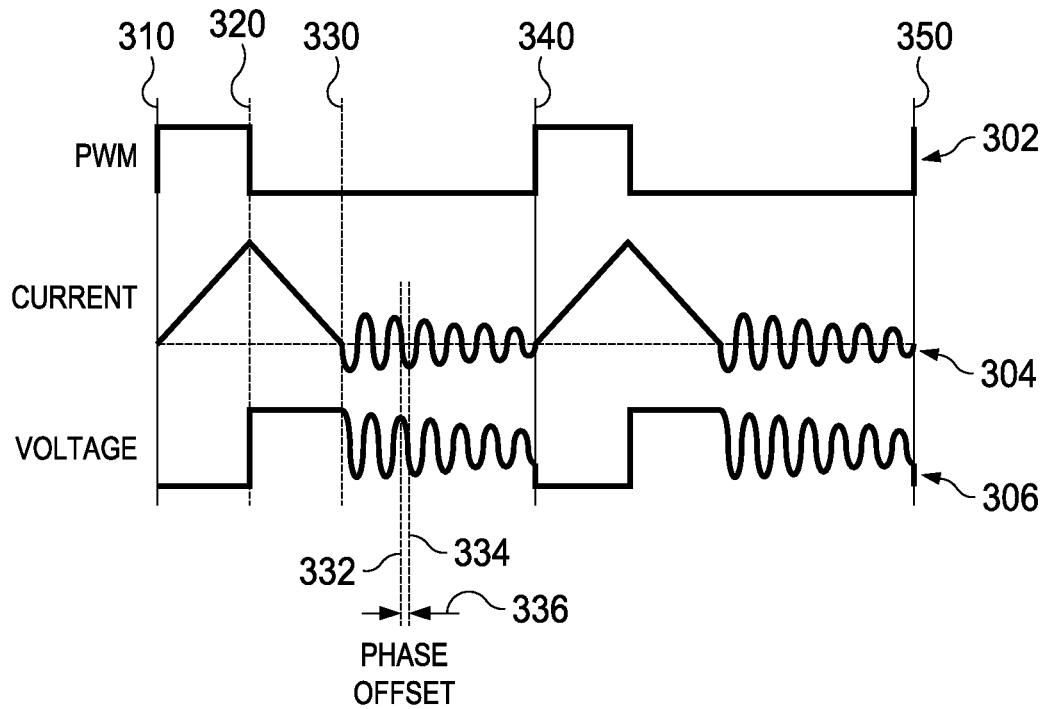
FIG. 3 is a waveform diagram illustrating selected-parameter adaptively switched power waveforms in accordance with example embodiments of the disclosure.

FIG. 3 is a waveform diagram illustrating selected-parameter adaptively switched power waveforms in accordance with example embodiments of the disclosure. Generally described, the diagram 300 includes SPA-PWM waveform 302, switch current waveform 304, and switch voltage waveform 306. The waveforms 302, 304, and 306 are arranged to illustrate variations of the magnitude of the respective signal over time. FIG. 2 and FIG. 3 are used to illustrate the operation of the power converter 200.

In operation of the power converter 200, the SPA-PWM signal 302 is shown as being asserted (e.g., having a rising edge and/or switched ON), starting at time 310. While SPA-PWM signal 302 is asserted (e.g., during the ON time of switch X1), the switch current signal 304 "ramps up," which charges the inductive energy storage element of the primary winding of transformer L1.

At time 320, the SPA-PWM signal 302 is shown as being de-asserted (e.g., having a falling edge and/or switched OFF), which opens the switch X1. When switch X1 is switched OFF, the stored inductive energy of the primary winding of transformer L1 is transferred to the secondary winding of transformer L1, passed through rectifying diode D1, and then is supplied to the load (e.g., power storage capacitor C1 and any device for sinking current that is coupled to the voltage output $V_{OUT}$) of the power converter 200. As the stored energy is gradually depleted (e.g., while switch X1 is switched OFF) the switch current signal 304 ramps down, even while the switch voltage signal 306 is maintained (e.g., by the charged stored in power storage capacitor C1).

At time 330, (e.g., when the stored energy is sufficiently depleted, the parasitic capacitive and inductive elements in the circuit (e.g., power converter and any load) cause the circuit to resonate at a resonant frequency. The oscillations typically start when the switch current signal substantially reaches a value of zero. The resonance of the parasitic capacitive and inductive elements of the circuit causes the switch current signal 304 to oscillate about the zero-current (e.g., or a minimum value near-zero) value and the switch voltage signal 306 to oscillate about a center voltage of the oscillation. The respective oscillations slowly damp down as the circulating energy gradually dissipates in the circuit.

As shown in FIG. 3, the switch current signal 304 and the switch voltage signal 306 have a phase relationship that is responsive to parasitic elements in the switch X1 and other components of power converter 200 (as well as any additional load coupled to the output of power converter 200). For example, the switch current signal 304 leads the switch voltage signal 306 by around 90 degrees. At time 332, the switch current signal 304 encounters a zero crossing, while the switch voltage signal 306 encounters a crossing of its center oscillation voltage at time 334. The time between the time 332 and 334 is a time duration that spans phase offset 336. The duration of the phase offset varies as a function of the frequency of the oscillation (and accordingly is a function of the period of a cycle of the oscillation as well).

As mentioned above with respect to FIG. 2, the switch X1 should (e.g., ideally) be turned ON when the current flowing (e.g., as a result of switch parasitic elements) through switch X1 is zero or when the voltage across switch X1 is zero. Additionally, the voltage and/or current oscillations should (e.g., ideally) be allowed to continue for a period of time that is sufficient for the oscillations to substantially damp down before turning the switch X1 ON. The SPA-PWM signal 302 is programmable to selectively delay the turn ON of the switch X1 for a length of time that is sufficient to allow the oscillation amplitudes to reduce to sufficiently low amplitudes at which the switch X1 can be efficiently asserted. Generally, the oscillation amplitudes typically decay to sufficiently low amplitudes after a relatively few (e.g., less than ten) oscillation cycles.

The SPA-PWM signal 302 is programmable to selectively delay the turn ON of the switch X1 because, for example, a fixed delay might not work for any given system that includes power converter 200. The fixed delay might not work for any given system because the oscillation frequency typically changes with in accordance with various operating conditions, system parameters, and applications. The circuitry is arranged for determining the oscillation period. In response to the determined value of the oscillation period, the circuitry for generating the SPA-PWM signal 302 is programmable for applying a selected delay that corresponds to a number of the oscillation cycles (e.g., and/or fraction thereof, in order to compensate for the phase offset when sensing voltages in order to switch at a valley that occurs during a zero crossing of current).

At time 340, the switch X1 is turned ON in response to the assertion of the SPA-PWM signal 302. The instant of the assertion of the SPA-PWM signal 302 is determined, for example, in response to a selected number (e.g., six) of oscillation cycles and a phase offset (e.g., that exists between the switch current signal 304 and the switch voltage signal 306). The selected number of oscillation cycles is multiplied by an oscillation period to provide sufficient time for oscillation time to dampen sufficiently. Accordingly, the switch X1 is opened (or closed) at a valley of the sensed parameter (e.g., voltage) to effectively achieve the turn ON/OFF instant at the zero crossing of the other system parameter (e.g., current). The damping times can be determined by a system designer based on various factors such as whether longer waiting times result in a lower switching frequency than is suitable for a power stage, whether the heat produced does not exceed desired operational parameters, whether the system efficiency goals are met, and the like.

In the example illustrated in FIG. 3, the SPA-PWM signal 302 is programmable to provide delays equal to fractions (e.g., one quarter) of the determined period of oscillation as well as a multiple cycle delay (e.g., six) to allow the oscillation amplitude to subside sufficiently. Accordingly, a first parameter is sensed to determine an oscillation period. A number of oscillation periods is selected that is sufficient for the oscillation peak amplitudes to subside sufficiently, and a fraction of an oscillation period is determined to compensate for a phase offset between the first parameter type (e.g., voltage) and a second parameter type (e.g., current) having a valley at which the switch X1 is to be actuated (e.g., switched ON or OFF).

At time 350, a successive rising edge of the SPA-PWM signal 302 is generated in accordance with a period of time that indicated by the selected number of oscillations and a phase offset that is determined in response to the respective types of the first and second parameters. A flexible, valley-switching mechanism for generating the SPA-PWM signal is discussed below with respect to FIG. 4 and FIG. 5 below.

Figure 4:
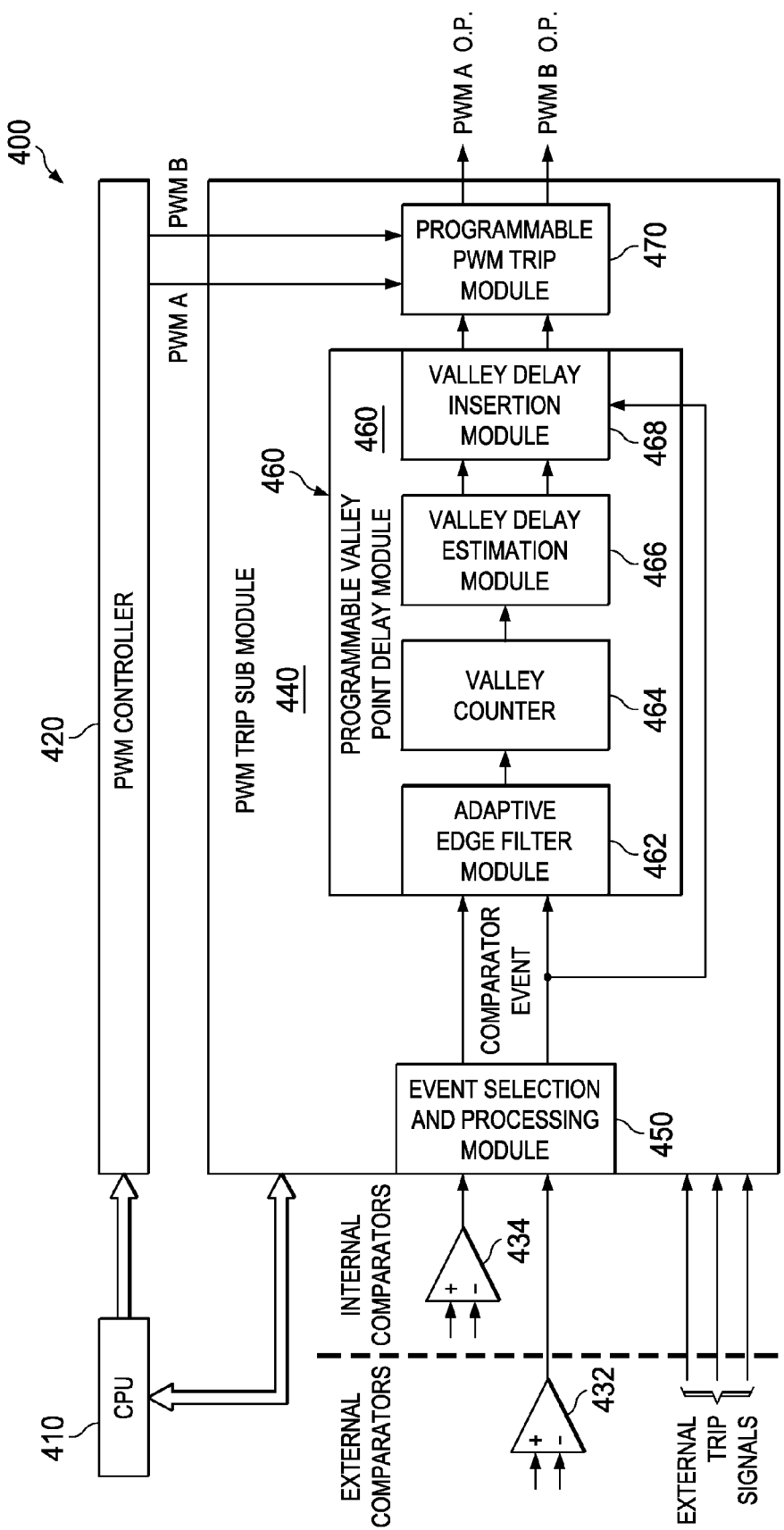
FIG. 4 is a block diagram illustrating a system for selected-parameter adaptively switched power conversion in accordance with example embodiments of the disclosure.

FIG. 4 is a block diagram illustrating a system for selected-parameter adaptively switched power conversion in accordance with example embodiments of the disclosure. System 400 includes CPU 410, PWM controller 420, external comparators 432, internal comparators 434, PWM trip sub-module 440, event selection and processing module 450, programmable valley point delay module 460, and programmable PWM trip module 470. Programmable valley point delay module 460 includes adaptive edge filter module 462, valley counter 464, valley delay estimation module 466, and valley delay insertion module 468.

CPU 410 is provided for executing applications and operating system tasks, wherein such tasks include monitoring and controlling system power that is generated by a power supply such as converter 210. CPU 410 controls PWM controller 420 and PWM trip sub-module 440 that are arranged to generate control signals (such as SPA-PWM signals) for one or more power switches X1 of a power supply.

PWM controller 420 is arranged for generating PWM signals in response to, for example, a selected pulse repetition rate and a selected duty cycle. Accordingly, the PWM signals generated by PWM controller 420 are not necessarily arranged to provide for efficient switching techniques such as valley switching.

External comparator 432 is arranged for determining events that are related to the start and/or duration of each SPA-PWM cycle (such as illustrated in FIG. 3). For example, external comparator 432 receives an external signal and compares the received external signal with a reference signal to determine the existence of an event. In one example, the external comparator 432 is arranged for generating a SPA-PWM reset signal that is generated in response to an indication of a system reset (or other related system event). In another example, one or more external comparators 432 are selected for monitoring one or more parameters of power outputs of the power supply. In yet another example, one or more external comparators 432 are used to monitor power management control signals and to adjust (or cease generation of) the various SPA-PWM output signals (e.g., PWM A O.P. and PWM B O.P.). One or more comparators can be used to monitor a single signal to determine a slope that is associated with the monitored single signal. (Optional external trip signals can be "hard wired" into the system in place of, or in addition to, using the programmably selected comparator to determine various system events.)

Internal comparator 434 is arranged for determining events that are related to the start and/or duration of each SPA-PWM cycle (e.g., such as cycles that occur at times 310, 340, and 350 as illustrated in FIG. 3). Although internal and external comparators are illustrated, either internal and/or external comparators can be used in accordance with convenience of implementation in a particular system to monitor a selected parameter. For example, internal comparator 434 receives an internal or external signal and compares the received internal signal with a reference signal to determine the existence of an event. In one example, the internal comparator 434 is arranged for generating a SPA-PWM reset signal that is generated in response to an indication of an expiration of a determined SPA-PWM delay. In another example, one or more external comparators 432 are selected for monitoring one or more parameters of power outputs of the power supply. In yet another example, one or more external comparators 432 are used to monitor peaks of power (e.g., voltage or current) oscillations that occur in the period between time 330 and time 340. One or more (internal and/or external) comparators can be used to monitor a single signal to determine a slope (and/or degree of oscillation decay) that is associated with the monitored single signal.

PWM trip sub-module 440 includes event selection and processing module 450, programmable valley point delay module 460, and programmable PWM trip module 470. The event selection and processing module 450 is arranged to select which of various parameters and other signals are to be monitored (e.g., by programmably selecting which internal or external comparator input or trip signal input to couple to the adaptive edge filter module 462 and the valley delay insertion module 468.)

The adaptive edge filter module 462 is arranged for receiving selected events (e.g., events related to monitored internal or external power supply parameters). The adaptive edge filter module 462 is further arranged for determining the existence of an event, a slope of a monitored signal, a start of the oscillation period, a peak of an oscillation of a monitored signal, the magnitude of a monitored signal, and the like. The programmable valley point delay module 460 uses the adaptive edge filter module 462, for example, to locate peaks of an oscillating signal (such as switch current signal 304 and switch voltage signal 306), and to use the peaks to determine the oscillation period and/or oscillation period. In another example, a threshold level is centered at the midpoint of the voltage oscillations to determine the period of oscillations by measuring the time between consecutive points at which the oscillating signal crosses the threshold level.

The valley counter 464 is arranged for counting valleys detected in response to, for example, peaks identified by the adaptive edge filter module 462. The valley counter 464 is arranged for determining a time period by counting transitions of a relatively fast (e.g., with respect to the pulse repetition rate of the SPA-PWM signal) clock that occur between peaks of the oscillations of a monitored signal. In another example, the valley counter 464 is arranged for counting valleys detected in response to the oscillation cycles identified by the adaptive edge filter module 462. The valley counter 464 is arranged for determining a time period by counting transitions of a relatively fast clock that occur between the oscillation cycles of a monitored signal.

The valley delay estimation module 466 is arranged for determining an estimate of a valley point of a selected parameter (e.g., such as voltage) based on the determined oscillation period and a phase offset relative to the selected parameter (e.g., an output voltage that is monitored) and a switching parameter (e.g., an output current) for which the valley point is to be determined. The valley delay estimation block can divide the (e.g., clock count) value of an oscillation period by four to generate a time value that is related to a phase offset of 90 degrees, for example. The valley delay estimation module 466 is arranged for providing an estimation of the amount of delay to be inserted before the switch X1 is turned ON (e.g., in order to selectively delay the turning ON of the switch X1).

The valley delay insertion module 468 is arranged for receiving the estimated valley delay point and to generate an indication of the expiration of the delay (e.g., the time between period 330 and 340) in response to the estimated valley delay point and system events (such as the number of transitions of the relatively fast clock used by the valley counter 464). The valley delay insertion module 468 is further arranged to provide SPA-PWM control signals to the programmable PWM trip module 470. The SPA-PWM control signals are generated, for example, in response to the start of the oscillations (e.g., which occurs at the first zero crossing of the switch current signal 304) and the expiration of the delay that immediately precedes the estimated valley delay point.

The programmable PWM trip module 470 is arranged for receiving PWM signals from the PWM 420 controller, for receiving the SPA-PWM control signals from the valley delay insertion module 468, and for generating the one or more SPA-PWM signals used to drive respective power switches (X1). In various embodiments, the programmable PWM trip module 470 can be functionally combined (e.g., in part or in whole) with the PWM controller 420. In embodiments where the programmable PWM trip module 470 is separate from the PWM controller 420, the programmable PWM trip module 470 design can be used to upgrade and enhance the efficiency of power supplies that include conventional power supplies (e.g., when using existing parts in new products, when providing modification kits for existing products, and the like).

Figure 5:
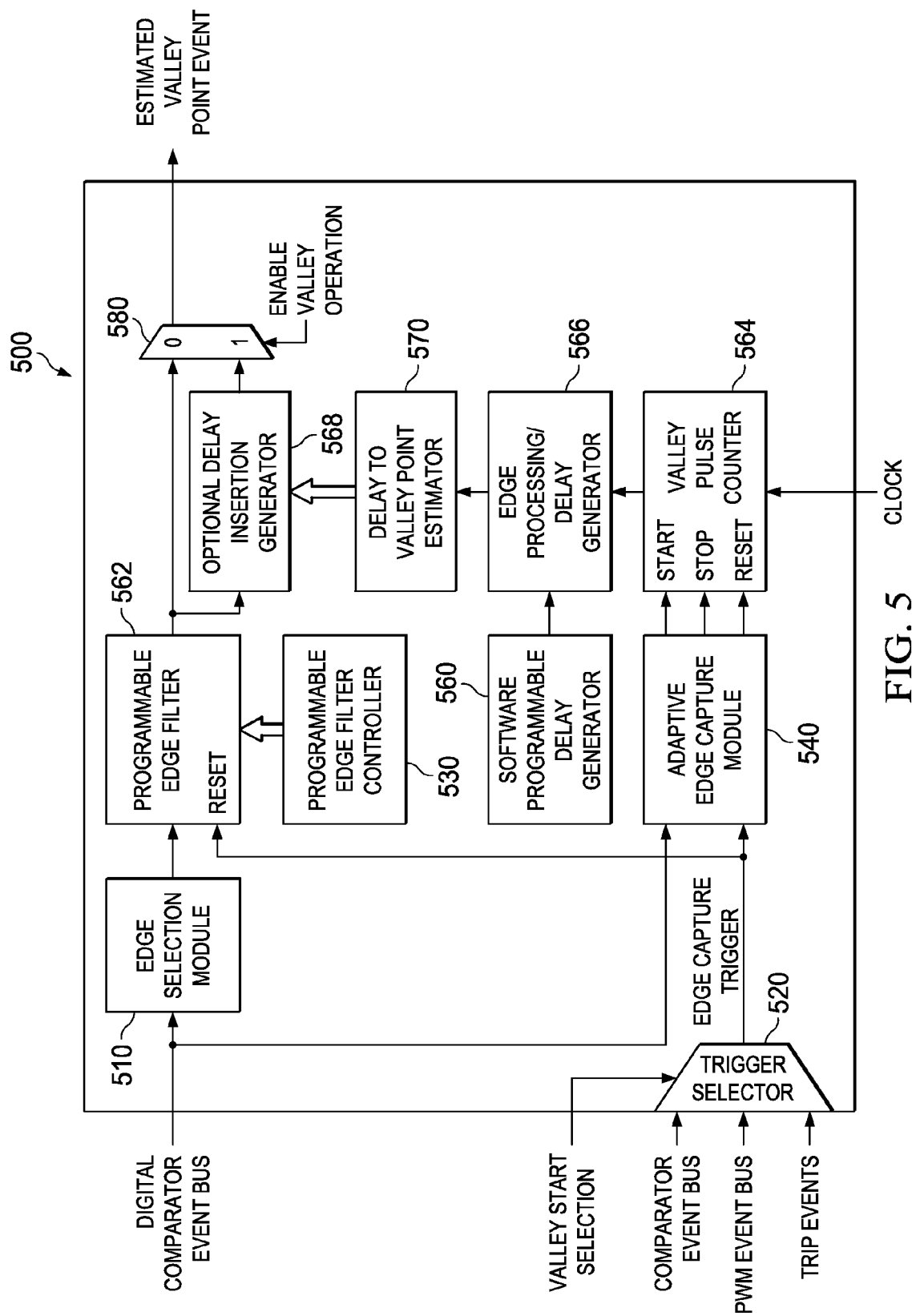
FIG. 5 is a block diagram illustrating a programmable valley point delay module for a selected-parameter adaptively switched power conversion system in accordance with example embodiments of the disclosure.

FIG. 5 is a block diagram illustrating a programmable valley point delay module for a selected-parameter adaptively switched power conversion system in accordance with example embodiments of the disclosure. Programmable valley point delay module 500 operates in a similar manner as programmable valley point delay module 460. Programmable valley point delay module 500 includes edge selection module 510, trigger selector 520, programmable edge filter controller 530, adaptive edge capture module 540, valley pulse counter 564, edge processing/delay generator 566, optional delay insertion generator 568, delay to valley point estimator 570, and multiplexer 580.

Edge selection module 510 is arranged for receiving notification of various system events from a digital comparator event bus. The digital comparator event bus transmits events such as events generated at the digital comparator outputs (e.g., internal comparator 434 and/or external comparator 432). The various system events for which notifications are received includes events that are related to signal parameters and parameter values associated with one or more oscillations of a power switch such as switch X1. Accordingly, the edge selection module 510 is arranged for selecting which output parameter (or parameters) is to be monitored for determining timing characteristics of a switch X1 in operation.

Each output parameter (including combinations of output parameters) selected by the edge selection module 510 is coupled as an input to the programmable edge filter 562 logic. The programmable edge filter 562 is responsive to commands received from the programmable edge filter controller 530, which is programmed, for example, by CPU 112 or CPU 410. The programmable edge filter controller 530 is programmable for filtering (e.g., such as by "skipping" or selecting) a programmed number of rising or falling (or both) edges of event signals. The types (e.g., rising, falling, or both) of edges to be monitored for triggering are selectable under programming control of a supervisor process executed by CPU 410, for example. The programmable edge filter 562 is reset or enabled (for example) by trigger selector 520.

Trigger selector 520 is arranged for selecting a parameter used for resetting the programmable edge filter 562 (as well as resetting, arming, and/or triggering the adaptive edge capture module 540). The trigger selector 520 is responsive to a valley start selection signal to select from which parameter the timing of the valley start is to be determined. The trigger 520 is arranged to select events that are signaled over a comparator event bus (e.g., events determined by digital or analog comparators), a PWM event bus (e.g., power supply-related events) and trip events (e.g., system reset signals). The output of the trigger selector 520 is an edge capture trigger signal, which is coupled to an input of the adaptive edge capture module 540.

The edge capture signal is arranged for triggering and arming the adaptive edge capture module 540 for identifying valley point instants to determine, for example, a timing oscillation period and/or frequency. The adaptive edge capture module 540 is programmable by the CPU 410 to start and stop the valley pulse counter 564 in response to a selected count of programmed edges of the selected parameter signal and selected edge type as described below. After the adaptive edge capture module 540 is armed by the edge capture trigger signal, the parameters for triggering the adaptive edge capture module 540 sequence of operations are monitored (e.g., by changing the state of trigger selector 520) by the adaptive edge capture module 540. Upon detection of a trigger (e.g., when the switch voltage signal 306 is selected as a trigger and falls at time 330), the adaptive edge capture module 540 asserts the start signal, which is coupled to the valley pulse counter 564. In response to the assertion of the start signal, valley pulse counter 564 is arranged for counting pulses of a clock signal. The valley pulse counter 564 is clocked by a clock signal such as an independent clock reference or a time base clock used to generate a (e.g., conventional) PWM signal.

When the adaptive edge capture module 540 has been reset and armed by the trigger selector signal, the adaptive edge capture module 540 asserts the start signal after (e.g., in response to) a detection of programmed number of selective events on the digital comparator event bus. The type of selected events and the number of selected events is programmable by a system processor such as CPU 410. When the start signal is asserted by the adaptive edge capture module 540, the valley pulse counter is arranged to start counting (e.g., in response to the assertion of the start signal).

In a similar fashion, the adaptive edge capture module 540 is arranged to assert the stop signal after a detecting a programmed number of events on the digital comparator event bus. In response to the assertion of the stop signal, the valley pulse counter 654 is arranged to stop counting. After the valley pulse counter 564 is stopped, the counter value of valley pulse counter 564 is read and stored. As described below, the value of the valley pulse counter 564 can be reset by the assertion of the reset signal (which in turn is asserted in response to the state of the edge capture trigger signal as selected by the trigger selector 520).

The counter value is stored, for example, in the software programmable delay generator 566 (which provides a delay value, as discussed below). No further valley pulse captures are typically performed until the edge capture trigger is once again asserted in response to an event selected by trigger selector 520. In an embodiment, both the valley pulse counter 564 and the programmable edge filter 562 are reset in response to an assertion of the edge capture trigger signal so that the valley pulse counter 564 and the programmable edge filter 562 both begin operating from a reset condition.

The edge processing delay generator 566 is arranged to optionally process the captured counter value to calculate the oscillation period and/or to determine a fractional multiples of the oscillation period. Determining a fractional multiple of the oscillation period compensates for a phase offset that occurs when determining an event by measuring an event by using a voltage-related parameter to control switching that optimally occurs at a zero-current moment of a switch X1. For example, a fractional multiple of 90 degrees is determined by dividing the counter value by four (e.g., which is accomplished in a binary integer by truncating two least-significant bits and shifting the remaining bits two positions to the right). Division by other numbers is possible in various embodiments.

The programmable valley point delay module 500 is optionally used to delay the point at which the oscillation peaks decay to a predicted voltage threshold. For example, a dynamic (e.g., responsive to operating conditions when being operated in an intended use) oscillation period is determined as described above. The delay to valley point estimator 570 is arranged to select a number of oscillation periods, after which the switch X1 is to be turned ON. The number of oscillation periods is selected by a processor such as the CPU 410 using lookup tables, algorithms, and the like. The lookup tables contain search indexes such as operating voltage, current capacity of switch X1, manufacturing process parameters, and simulation results, and the like. The captured counter value is multiplied by selected number of periods (and a fractional phase-offset delay optionally added) to generate an estimation of a valley point at which the switch X1 is to be switched. In addition, an optional software programmable delay can be selected as programmed by a processor such as the CPU 410 via software programmable delay generator 560.

The optional delay insertion generator 568 is arranged, for example, to generating a delay event to be used to delay the rising or falling edge of a PWM signal. The delay insertion generator 568 generates the delay event in response to a selected comparator event signal received from programmable edge filter 562. The delay insertion generator 568 generates the delay event such that the generated delay event occurs coincident with the estimated valley point.

Multiplexer 580 is arranged to select one of the selected comparator event signal received from programmable edge filter 562 and the delay event signal generated by the delay insertion generator and to transmit the selected signal to a programmable PWM trip module 470. The selection is made in response to the state of the enable valley operation signal. The programmable PWM trip module 470 is arranged for PWM waveform generation. The programmable PWM trip module 470 is arranged for controlling the PWM waveform edges (including the rising and/or falling edges) based on the processed comparator events received from the programmable valley point delay module 500.

In various embodiments, the above described components can be implemented in hardware or software, internally or externally, and share functionality with other modules and components as illustrated herein. For example, the comparators 432 and 434 and the PWM controller 420 can be implemented outside of a device and/or substrate upon which the programmable valley point delay module 460 resides.

The various embodiments described above are provided by way of illustration only and should not be construed to limit the claims attached hereto. Those skilled in the art will readily recognize various modifications and changes that could be made without following the example embodiments and applications illustrated and described herein, and without departing from the true spirit and scope of the following claims.

What is claimed is:

1. A power supply system, comprising:
   a power supply switch for switching input power of a power supply coil;
   a counter for determining a period of an output oscillation of the power supply switch, wherein the output oscillation starts when an output current generated by stored power of the power supply coil decays; wherein the period of the output oscillation of the power supply switch is determined by counting transitions of a clock; and
   a pulse generator that generates a switching delay for the power supply switch;
   wherein the switching delay is determined in accordance with a formula: period of switching delay=((a selected number of oscillations)×(the determined oscillation period))+(a phase offset);
   wherein the phase offset equals a difference in time between a zero-crossing of voltage across the power supply switch and a zero-crossing of current through the power supply switch.

* * * * *